United States Patent
Robertson

(10) Patent No.: US 10,738,571 B2
(45) Date of Patent: Aug. 11, 2020

(54) POWERING AN ESP SENSOR USING AC CURRENT

(71) Applicant: RMS PUMPTOOLS LIMITED, Cumbria (GB)

(72) Inventor: Mark Patrick Robertson, Aberdeenshire (GB)

(73) Assignee: RMS PUMPTOOLS LIMITED, Cumbria (GB)

( * ) Notice: Subject to any disclaimer, the term of this patent is extended or adjusted under 35 U.S.C. 154(b) by 421 days.

(21) Appl. No.: 15/335,789

(22) Filed: Oct. 27, 2016

(65) Prior Publication Data

US 2017/0122074 A1 May 4, 2017

(30) Foreign Application Priority Data

Oct. 29, 2015 (GB) .................................. 1519140.6

(51) Int. Cl.
*E21B 41/00* (2006.01)
*H04B 3/54* (2006.01)
*E21B 43/12* (2006.01)

(52) U.S. Cl.
CPC .............. *E21B 41/00* (2013.01); *H04B 3/54* (2013.01); *E21B 43/128* (2013.01)

(58) Field of Classification Search
CPC .......... E21B 41/00; E21B 43/128; H04B 3/54
See application file for complete search history.

(56) References Cited

U.S. PATENT DOCUMENTS

| | | | |
|---|---|---|---|
| 3,340,500 A | | 9/1967 | Boyd et al. |
| 4,491,778 A | * | 1/1985 | Knox ................ H02M 7/53873 318/803 |
| 4,523,194 A | * | 6/1985 | Hyde .................... E21B 17/003 307/127 |
| 5,539,375 A | | 7/1996 | Atherton |
| 5,670,931 A | * | 9/1997 | Besser .................... H04B 3/542 175/50 |
| 9,206,684 B2 | * | 12/2015 | Parra ....................... E21B 47/12 |
| 2002/0024783 A1 | * | 2/2002 | Underwood ............ H02M 7/48 361/91.1 |
| 2011/0051297 A1 | * | 3/2011 | Knox ................... E21B 47/0007 361/23 |
| 2012/0121224 A1 | * | 5/2012 | Dalrymple ............ E21B 17/023 385/101 |
| 2013/0098632 A1 | * | 4/2013 | Wetzel .................. E21B 43/128 166/373 |

(Continued)

FOREIGN PATENT DOCUMENTS

| | | |
|---|---|---|
| EP | 1197011 B1 | 8/2004 |
| WO | WO 2004/028064 A2 | 4/2004 |
| WO | WO 2013/132231 A1 | 9/2013 |

(Continued)

OTHER PUBLICATIONS

Intellectual Property Office, Search Report for Application No. GB1519140.6, dated May 23, 2016, 3 pages, United Kingdom.

*Primary Examiner* — Michael R Wills, III
(74) *Attorney, Agent, or Firm* — Alston & Bird LLP

(57) ABSTRACT

A system for powering down-hole instrumentation/equipment used with an electrical submersible pump that has a motor and a cable, the system comprising a down-hole current transformer operable to convert a current in a phase of the cable to power down-hole instrumentation.

5 Claims, 12 Drawing Sheets

(56) References Cited

U.S. PATENT DOCUMENTS

2014/0102721 A1* 4/2014 Bespalov .............. E21B 33/072
166/385
2015/0109138 A1* 4/2015 Shanks .................... H04B 3/54
340/854.9

FOREIGN PATENT DOCUMENTS

| WO | WO 2013/132232 A1 | 9/2013 |
| WO | WO 2013/132233 A1 | 9/2013 |
| WO | WO 2013/132234 A1 | 9/2013 |

* cited by examiner

POWERING AN ESP SENSOR USING AC CURRENT

CROSS-REFERENCE TO RELATED APPLICATION

This application claims priority to and the benefit of United Kingdom Patent Application No. 1519140.6, filed on Oct. 29, 2015, the contents of which as are incorporated by reference herein in their entirety.

BACKGROUND

Related Field

The present invention relates to an electric submersible pump system. In particular, the present invention relates to a power supply for use with an electric submersible pump system. The power supply can be used to power down-hole electronics, for example down-hole communication systems.

FIG. 1 shows a typical oil-well electric submersible pump (ESP) system. This has a down-hole three phase cable, a three phase ESP motor, an ESP seal section (an oil reservoir and bearing assembly), an ESP pump and a remote electronic instrumentation system with power-line communications capability. FIG. 2 shows a single-line diagram for the system of FIG. 1. This has a 480V AC supply, a multi-tapped, step-up isolating transformer, a three phase cable and a medium voltage motor. The 480V AC supply may be fixed or variable frequency. FIG. 3 is a simplified electrical schematic of an isolated portion of FIG. 2. This shows the inductance of the step-up transformer's secondary winding, the resistance of the cable and the inductance of the medium voltage motor. The step-up transformer and motor are both shown wye-connected as is typical.

Description of Related Art

Power-line communication systems for electric submersible pumps configured as shown in FIGS. 1 to 3 are well known. For example, U.S. Pat. No. 3,340,500 describes a system for translating electrical energy and information represented by a varying electrical signal between a surface location at the top of a deep well or shaft over a cable to the bottom of such a shaft. A sensing and indicating circuit is completed by the ground connections at the down-hole and surface locations. U.S. Pat. No. 5,539,375 describes down-hole instrumentation that includes active electronic components to provide a sequence of signals. WO 2004/028064 describes a method for communicating messages between down-hole equipment and surface equipment.

Power-line communication systems are typically direct current, loop-powered, milliamp transmitters which are connected to the two system neutrals using simple inductor-capacitor filters. FIG. 4 shows a typical state-of-the-art ground-loop power-line communications system connected to a typical isolated ESP power system. This has a DC current loop source at the surface, and a remote, downwell DC current loop sink. Typical values for the DC resistances of the various conductors and windings are shown. For example, using the DC current loop source a DC voltage of 36V may be applied to the step-up transformer's neutral wire via a first inductor-capacitor filter. The resistance (ZL1) of the inductor may be 600 ohms. The current supplied to the system ($I_{source}$) is measured. This current may be decoded as the sum of the remote device's power supply current and information-carrying signal current.

At the ESP motor a single remote loop-powered transmitter is connected to the motor neutral using a second inductor-capacitor filter. A typical resistance for inductors of the type used is 600 ohm. The remote transmitter incorporates a power supply unit (drawing for example 10 mA) and a variable resistance. By varying resistance over time information can be transferred. The variable resistance is typically implemented as an electronic circuit which modulates the total current draw ($I_{sink}$) between the power supply current (typically 10 mA) and an upper value (typically 18 mA). This modulation may carry analog or digital information.

In use, when the modulation is at zero-scale the only current draw is the power supply's 10 mA current draw. The voltage drop through the inductors is 6V across each making 12V drop in total. In this condition 12 VDC is dropped across ZL1 and ZL2 and 24 VDC reaches the remote device's power supply (Vpsu). With the modulation at full-scale (18 mA) the drop across ZL1 and ZL2 is (2*600*0.018=21.6V). At this full-scale modulation Vpsu drops to 14.4 VDC.

A limitation of known power-line communication systems is that they have a low power transfer capability. In the example above, the power available at the power supply unit of the remote device is (14.4 VDC*10 mA=0.144 W). Reducing the inductor resistance, increasing the voltage supplied to around 180 VDC and reducing the modulation range have been employed as strategies to increase power transfer capability by 1-2 W.

Another limitation is the adverse effect of system grounding. FIG. 5 shows a fault at the bottom of the phase A winding of the motor. The fault resistance is shown as 0 ohm, typical of what may happen should fluid from the oil well leak into the ESP motor and collect at its base. This presents a short circuit across the remote inductor-capacitor filter and it becomes impossible to transfer power to the remote device. A typical minimum Vpsu required to operate the remote device may be 8 VDC. In the described system the minimum Vpsu threshold is breached should the fault have a resistance of 3,300 ohms or lower.

Yet another limitation is the bandwidth achievable for data communications. The inductor-capacitor filter of these systems is designed to pass DC (and very low frequencies) and reject power frequencies above 20-30 Hz. As a result, they do not have the capacity to pass high frequency signals and the bandwidth is limited to around 5-10 bits-per-second.

A further limitation is that it is difficult to deploy more than one loop-powered transmitter in parallel within the system. This is because if one transmitter fails by shorting to ground then all the transmitters will fail. Also if one transmitter fails by not maintaining a stable current when it is not communicating then this affects all the transmitters. Furthermore, a time-division-multiplex scheme needs implemented between the multiple transmitters and this reduces the bandwidth per device from what is already a low capacity. Also, as each system is operated in parallel each draws a power supply current and this increases the total current. This becomes impractical due to the need to pass these multiple currents through the inductor ZL1.

AC based systems have also been developed. Recent examples of AC communications systems are described in WO2013/132231, WO2013/132232, WO2013/132233 and WO2013/132234. In AC based systems, a down-hole unit is AC coupled to conductors of a power cable through a wye point of an ESP motor assembly and a surface unit is AC coupled to conductors of a power cable.

BRIEF SUMMARY

According to the present invention, there is provided a system for powering down-hole instrumentation used with an electrical submersible pump that has a motor and a cable, the system comprising a down-hole current transformer operable to convert a current in a phase of the electrical submersible pump cable to power remote instrumentation. Advantageously, this system can continue to power the remote instrumentation even when the power system is grounded.

The down-hole current transformer can be located around a phase of the cable. In particular, it may be manufactured as part of a wye point of a motor of the submersible pump. For a submersible pump with a first and second motor, the current transformer may be positioned between the first and second motor of the submersible pump. Alternatively, the current transformer may be manufactured as part of a motor or into a connector or splice of the system.

A surface current transformer may be provided to induce a current in a phase of the cable and the down-hole current transformer may transform the current to power the remote instrumentation. Advantageously, this allows remote instrumentation to be powered when the ESP motor is not running. Another advantage of this system is that multiple, independent remote devices may be powered. These independent devices may be around the same phase conductor or on different phase conductors.

In another aspect of the invention, there is provided a power line communication system for use with an electrical submersible pump and a remote down-hole measurement device, the power line communication system comprising: a first down-hole current transformer operable to convert a first current in a phase of a cable of the pump to power the measurement device, a processor for processing data from the measurement device to create a data signal for sending to the surface, and a second down-hole current transformer for modulating the data signal onto current in a phase of the cable.

An advantage of this system is the elimination of the inductor-capacitor filter of state-of-the-art systems, enabling higher power transfer to the remote instrumentation. Another advantage of this system is that it can carry both power-supply and communications currents within the same phase-loop, eliminating the need for ground-return currents for either power or communications.

BRIEF DESCRIPTION OF THE FIGURES

Various aspects of the invention will now be described by way of example only and with reference to the accompanying drawings, of which.

DETAILED DESCRIPTION OF VARIOUS EMBODIMENTS

Figure 1:
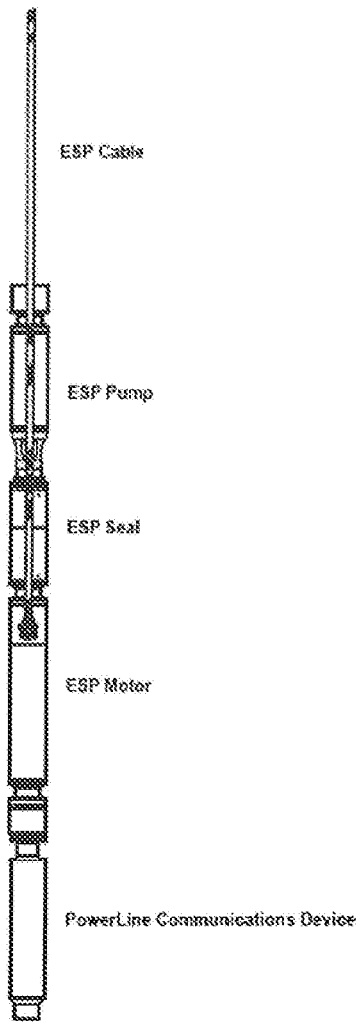
FIG. 1 shows a typical oil-well electric submersible pump (ESP) system.
Figure 2:
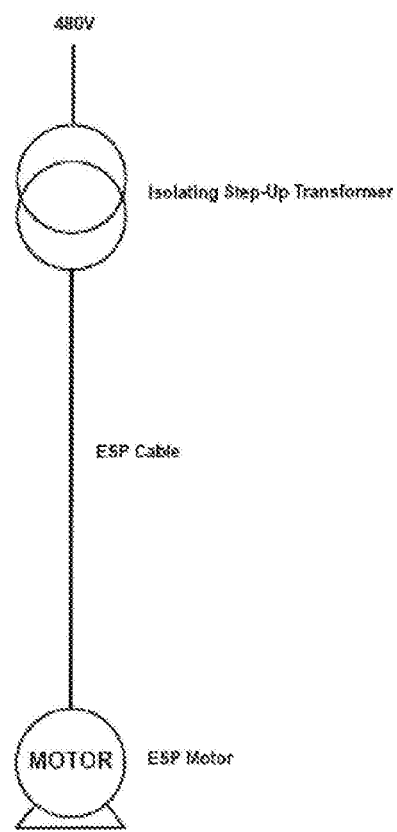
FIG. 2 shows a single-line diagram for the system of FIG. 1.
Figure 3:
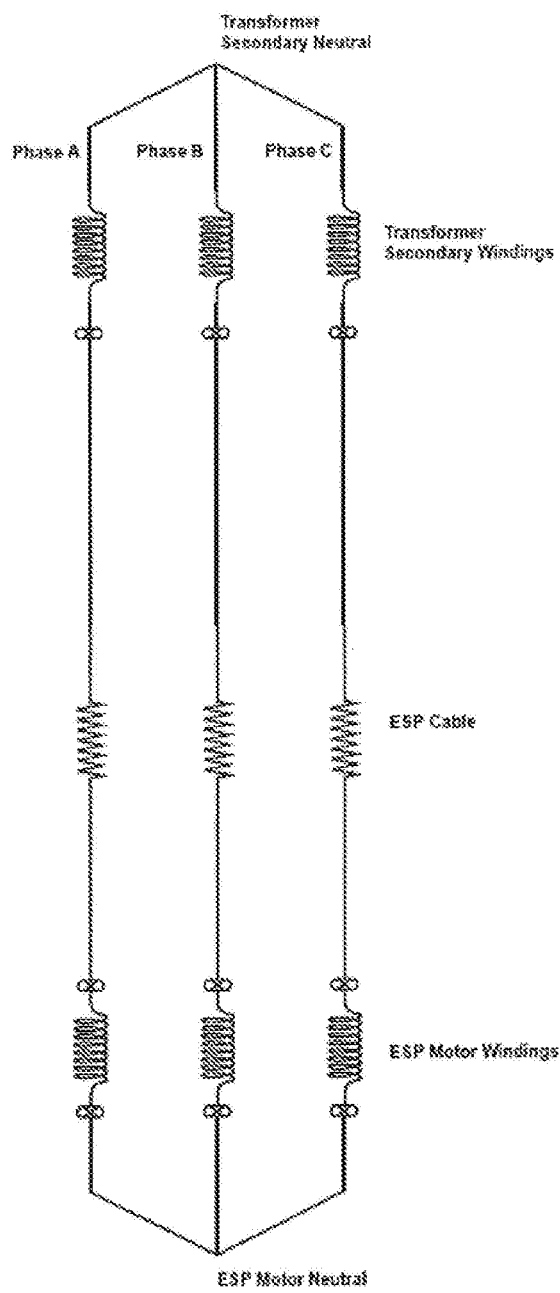
FIG. 3 is a simplified electrical schematic of an isolated portion of FIG. 2.
Figure 4:
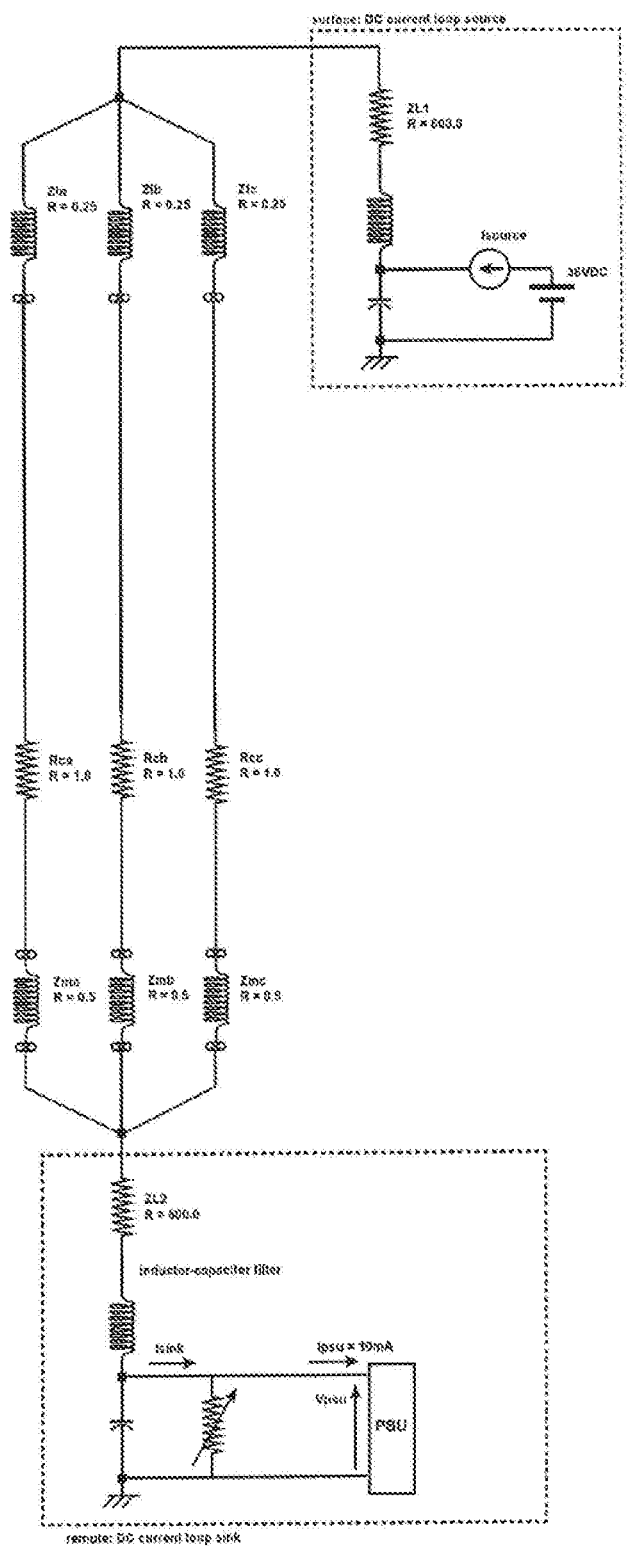
FIG. 4 shows a typical state-of-the-art ground-loop power-line communications system connected to a typical isolated ESP power system.
Figure 5:
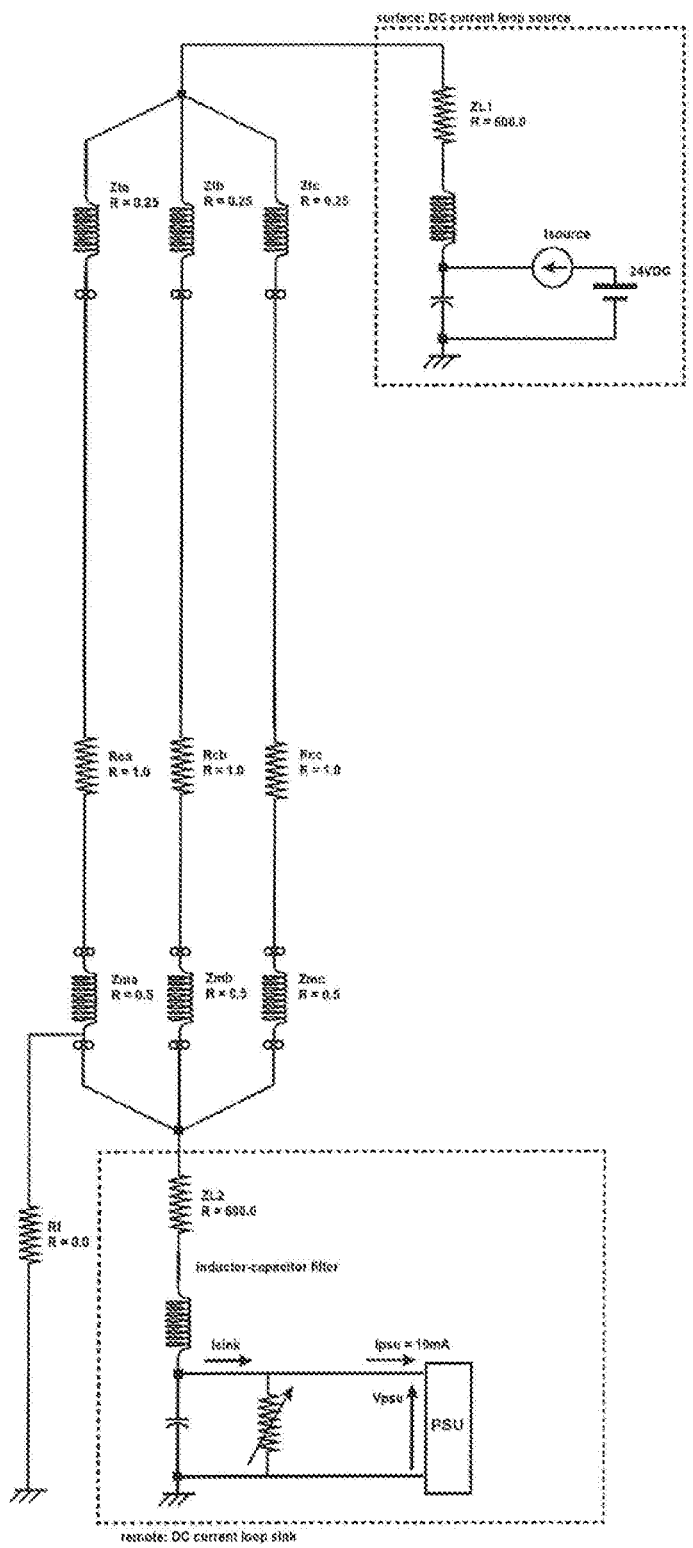
FIG. 5 shows a fault at the bottom of the phase A winding of the motor.
Figure 6:
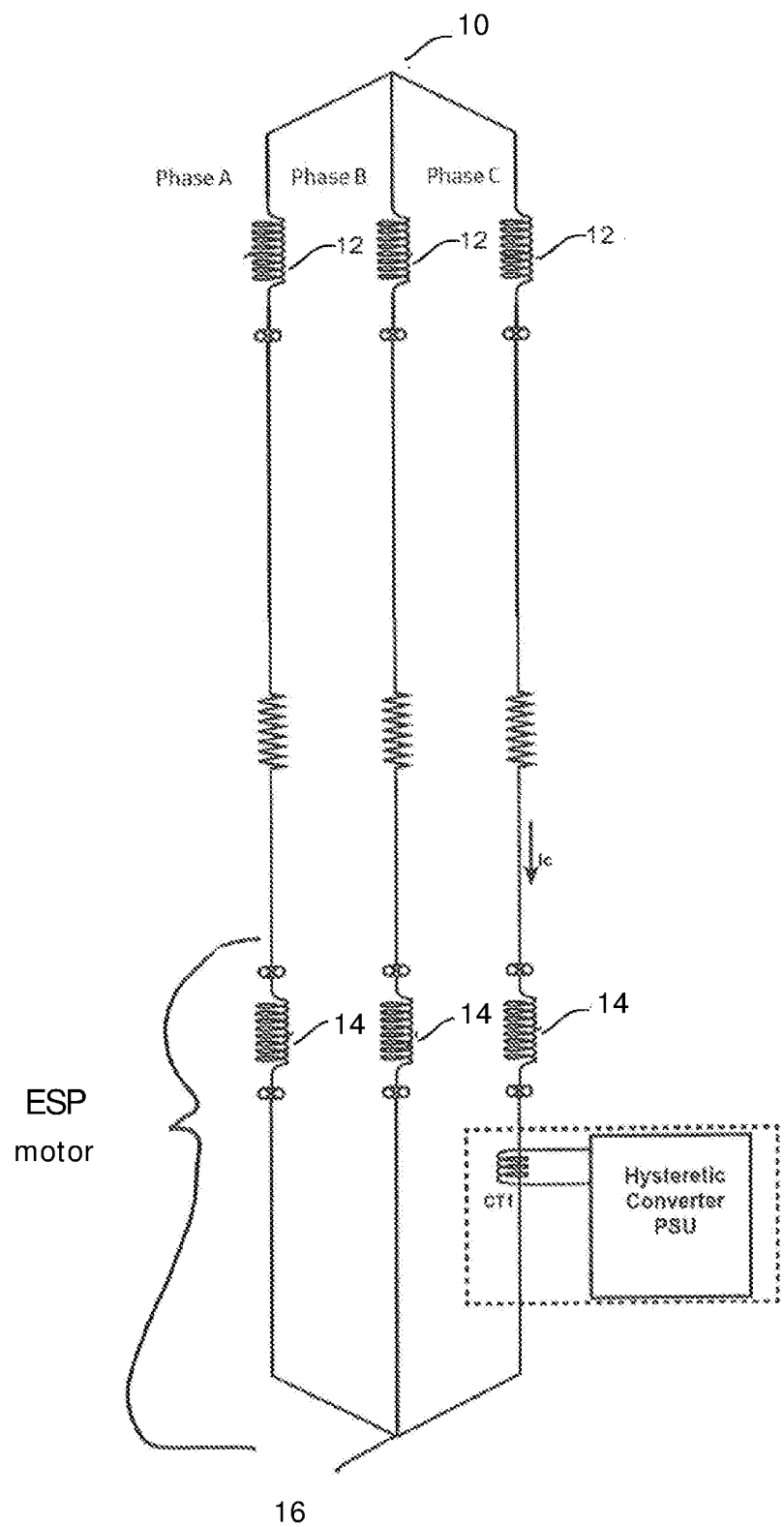
FIG. 6 is a a schematic diagram of a three phase, isolated ESP power system with a remote current transformer.

FIG. 6 shows an isolated electrical submersible power system. The power system has three phases: phase A, phase B and phase C. A three phase isolating step up transformer is connected via a three phase cable to a three phase electrical submersible power motor. The system is designed such that, in use, the step up transformer is located above ground and the motor operates down-hole, below ground.

The step up transformer is represented in FIG. 6 by a neutral point 10 and three secondary windings 12. Each secondary transformer winding 12 has one terminal connected to the transformer neutral point 10 to form a star or wye configuration and a second terminal connected to a phase of the ESP cable.

The ESP motor is represented by three ESP motor windings 14 and an ESP motor neutral point 16. All three phases of the ESP cable extend down-hole and are connected to the three windings 14 of the ESP motor. This arrangement allows each winding 14 of the motor to be driven by alternating current via each of the three power cables stemming from the three phase transformer. The upper terminal of each ESP motor winding 14 is connected to a phase of the ESP cable. The lower terminals are connected together to the ESP motor neutral point 16 to form a star or wye configuration. Located between the phase C motor winding and the neutral point of the motor 16 is a toroidal current transformer CT1.

FIG. 6 shows a phase current $I_c$ flowing towards the phase C winding of the motor. A phase current flows through a phase of the cable whilst the motor is running. Phase current $I_c$ induces a secondary current in the secondary windings of the current transformer CT1. The output of the current transformer CT1 is connected to a hysteretic power supply which converts the CT secondary current to a stable, useable voltage. This allows power to be transferred to remote electronics whilst the motor is running.

The current transformer CT (and power supply) can be selected for the appropriate phase current range and required VA (power) for the remote electronics. A typical example is a 50 VA CT with ratio 1:160 designed for 50-100 amps primary current across the frequency range 30-75 Hz. The output of the power supply PSU may be used to power a variety of electronics such as a data logger or a power-line communications system. As can be seen in FIG. 6, the hysteretic converter power supply PSU and the current transformer CT1 form an isolated system.

Figure 7:
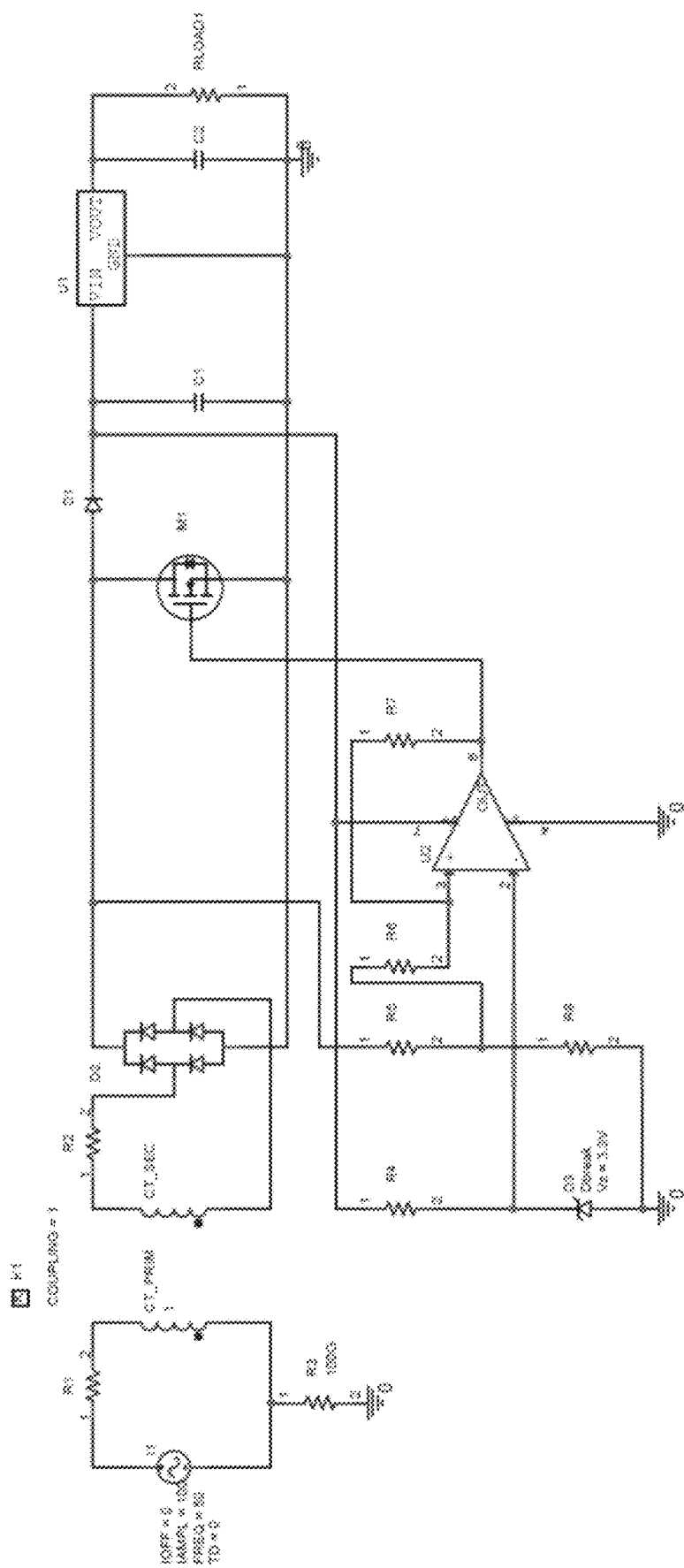
FIG. 7 is a schematic diagram of current base hysteretic power supply PSU for remote instrumentation.

FIG. 7 shows an example of a current-based, hysteretic power supply PSU. This comprises a current transformer, a full-wave rectifier and a FET controlled by a hysteretic converter circuit. The design shown in FIG. 7 yields a power capability of 14.3 W (at 10V) when supplied by a 50 VA, 100:0.5 A current transformer, designed for 50/60 Hz operation, across the primary current (Ic) range 50-100 A. Power supply units are well known and so will not be described in detail.

Figure 8:
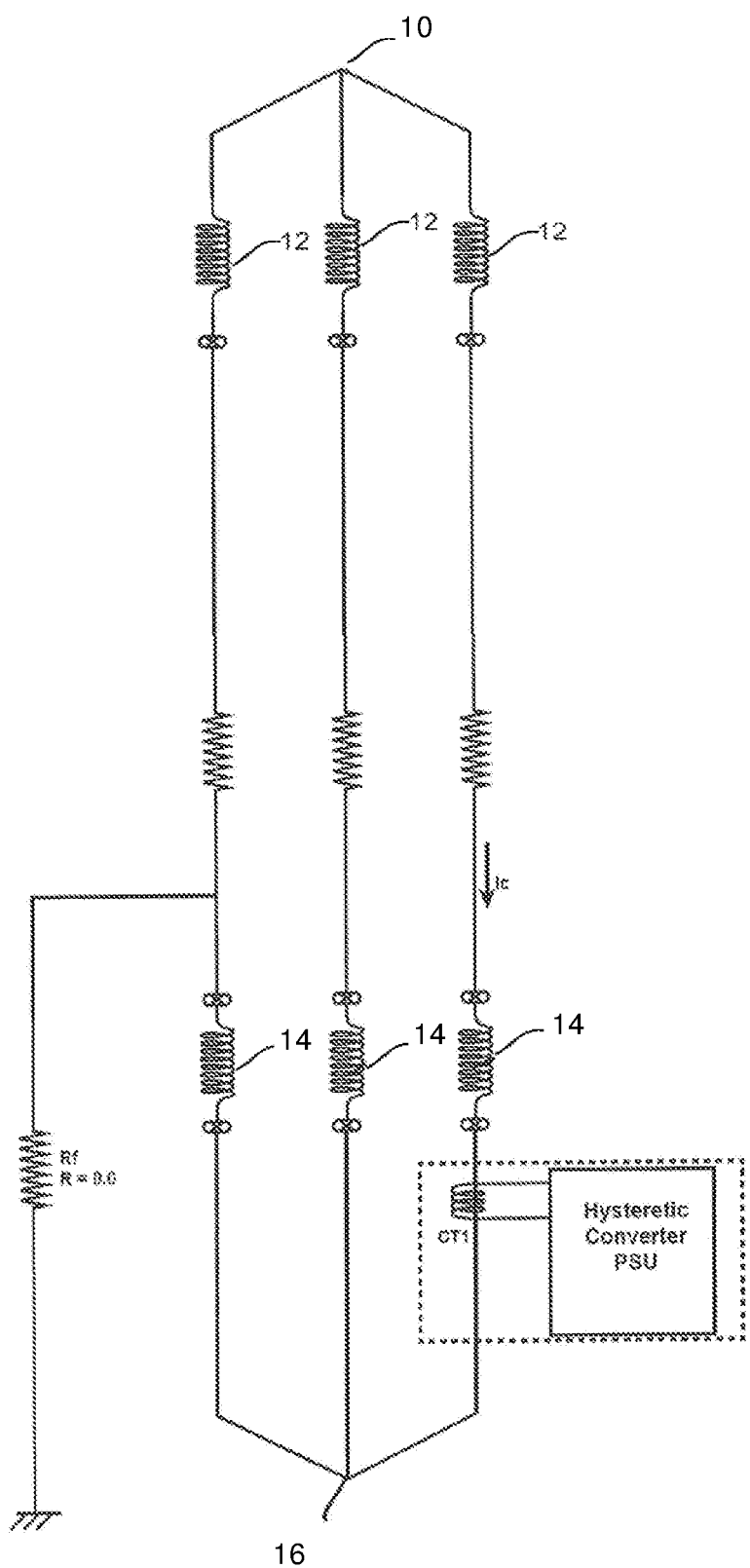
FIG. 8 is a schematic diagram of an ESP power system with a phase-to-ground fault.

FIG. 8 shows the system of FIG. 6 with an example of a phase-to-ground fault. System grounding can occur due to cable insulation breakdown, intentional phase or neutral grounding. A fault point is located above the phase A motor winding 14 and below the phase A transformer winding 12. The fault is represented by a coupling between the fault point and earth. The fault resistance is shown as 0 ohms, which corresponds to a worst case value. A fault can also result in a fault resistance greater than 0 ohms.

In the event of system grounding, the running of the ESP motor is unaffected as the power system is isolated neutral. Therefore, the phase current $I_c$ continues to flow unchanged by the system grounding. As described above, the power supply PSU and current transformer also form a separate isolated system. Therefore, in the event of a phase-to-ground fault, the current $I_c$ still reaches the current transformer CT1 allowing the power supply PSU to be powered. Any remote device connected to the power supply PSU can continue to be powered in the event of a phase-to-ground fault.

Figure 9:
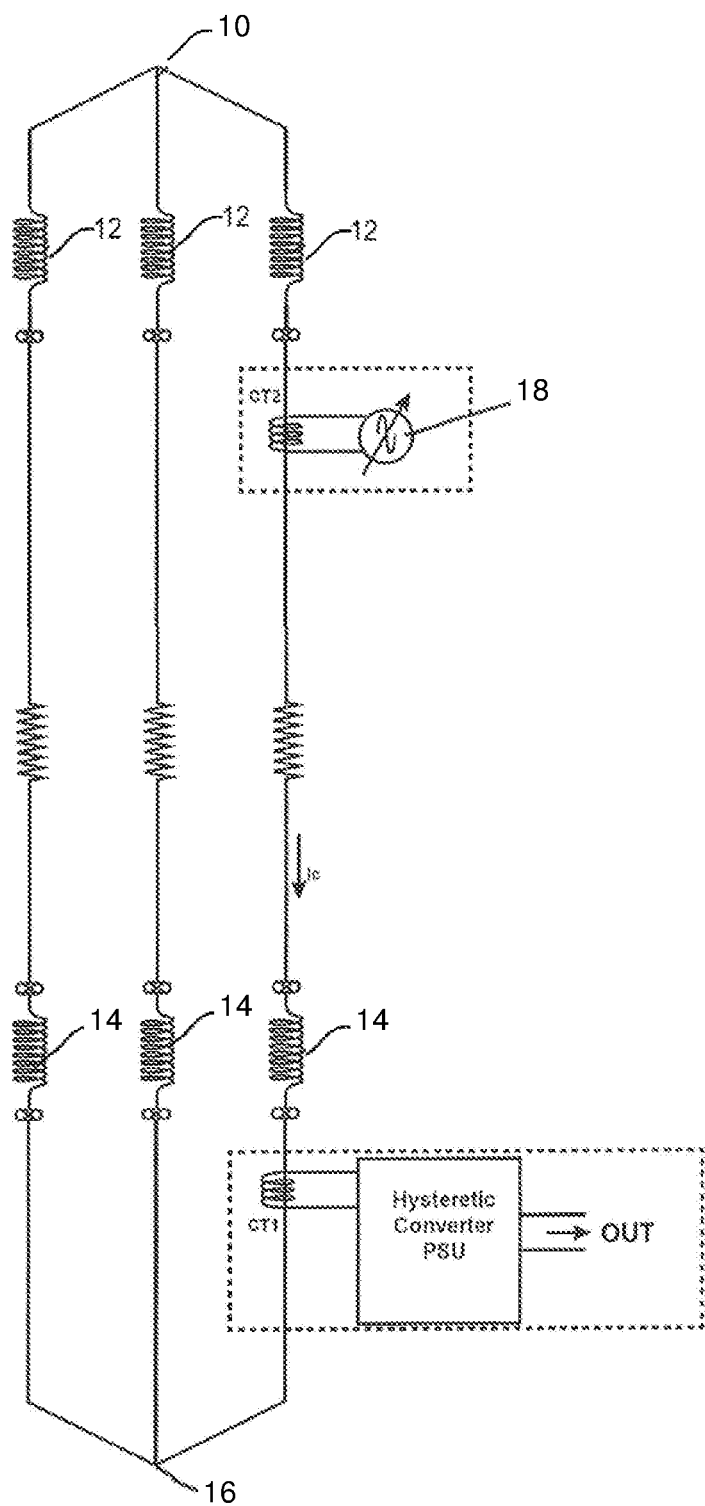
FIG. 9 is a schematic diagram of an ESP power system with a second current transformer.

FIG. 9 is a variation of the system of FIG. 6 in which a second, upper current transformer (CT2) is located at the surface. The upper current transformer CT2 is shown installed around phase C of the electric submersible pump cable and located below the secondary winding 12 of the transformer. Connected across the upper current transformer CT2 is a variable AC source 18. The upper current transformer CT2 is operated in reverse, that is, a variable AC voltage is applied to the secondary winding of CT2 and, in turn, a primary current is induced in phase C of the ESP cable. This current flows towards the lower current transformer CT1 and is denoted as $I_c$ in FIG. 9.

By inducing a current in phase C of the cable, the remote current transformer CT1 can be excited allowing remote instrumentation to be powered even when the ESP motor is not running. Using the upper current transformer CT2 to provide power to down-well remote instrumentation via the lower current transformer CT1 means that the three phase system is unaffected by any ground fault. The induced phase-loop current may be at motor frequency or another frequency.

Figure 10:
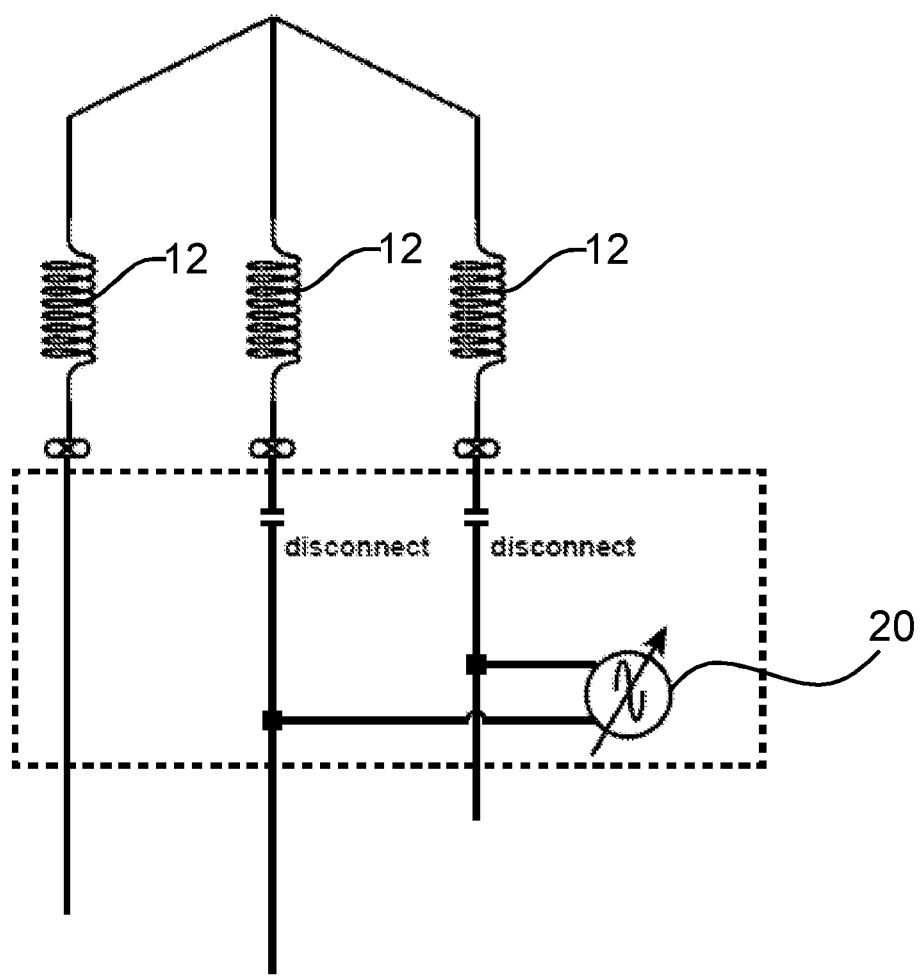
FIG. 10 is a schematic diagram of an alternating-current voltage source connected across phases of an ESP cable.

FIG. 10 shows a variation of the arrangement of the transformer of FIG. 9 in which a loop current can be produced during times that the ESP motor is not running. In this case, Phase B and Phase C of the ESP cable are disconnected from their corresponding secondary windings of the transformer. A variable AC source 20 is connected across phase B and phase C of the ESP cable to form a circuit. By applying a voltage using the AC source, a loop current can be created. By varying the voltage of the AC source 20, the loop current can be varied.

Figure 11:
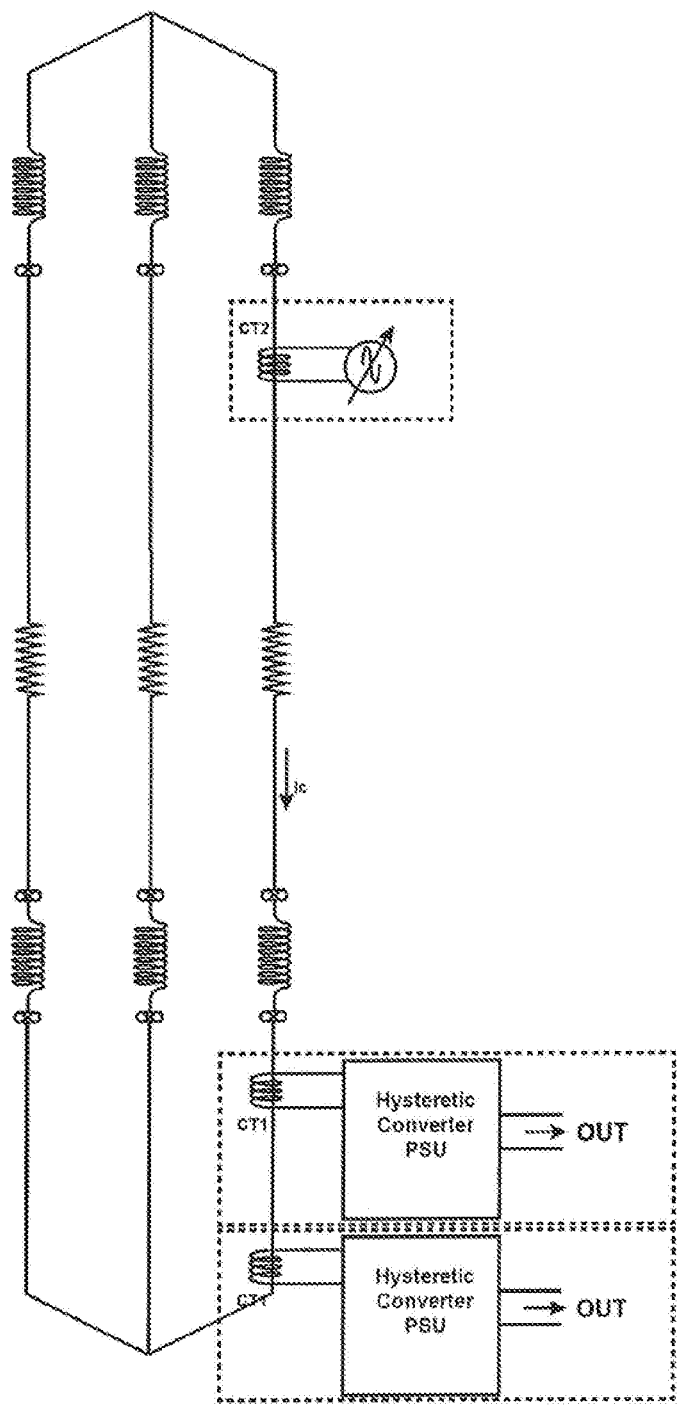
FIG. 11 is a schematic diagram of an ESP system with multiple remote devices.

FIG. 11 shows an alternative arrangement to the system of FIG. 9 containing multiple remote devices, each with its own current transformer. Positioned below the first isolated lower current transformer CT1 and associated hysteretic converter power supply unit PSU subsystem is a second lower current transformer CT1 and associated hysteretic converter power supply unit PSU subsystem. Both subsystems operate under the same principles as described above. In operation, the loop current $I_c$ will induce two secondary currents in the secondary windings of the lower current transformers CT1s of the first and second isolated subsystem. The output of each lower current transformer CT1 is connected to the associated hysteretic power supply resulting in two separate stable, useable voltages. This allows power to be transferred to two remote electronic instruments independently. The two systems are also isolated from one-another. Therefore, should one fail it does not affect the power available to the other remote devices.

FIG. 11 shows two independent devices connected around the same phase conductor. However, it is possible that multiple, independent devices may be positioned around the same phase conductor or on a different phase conductor.

Figure 12:
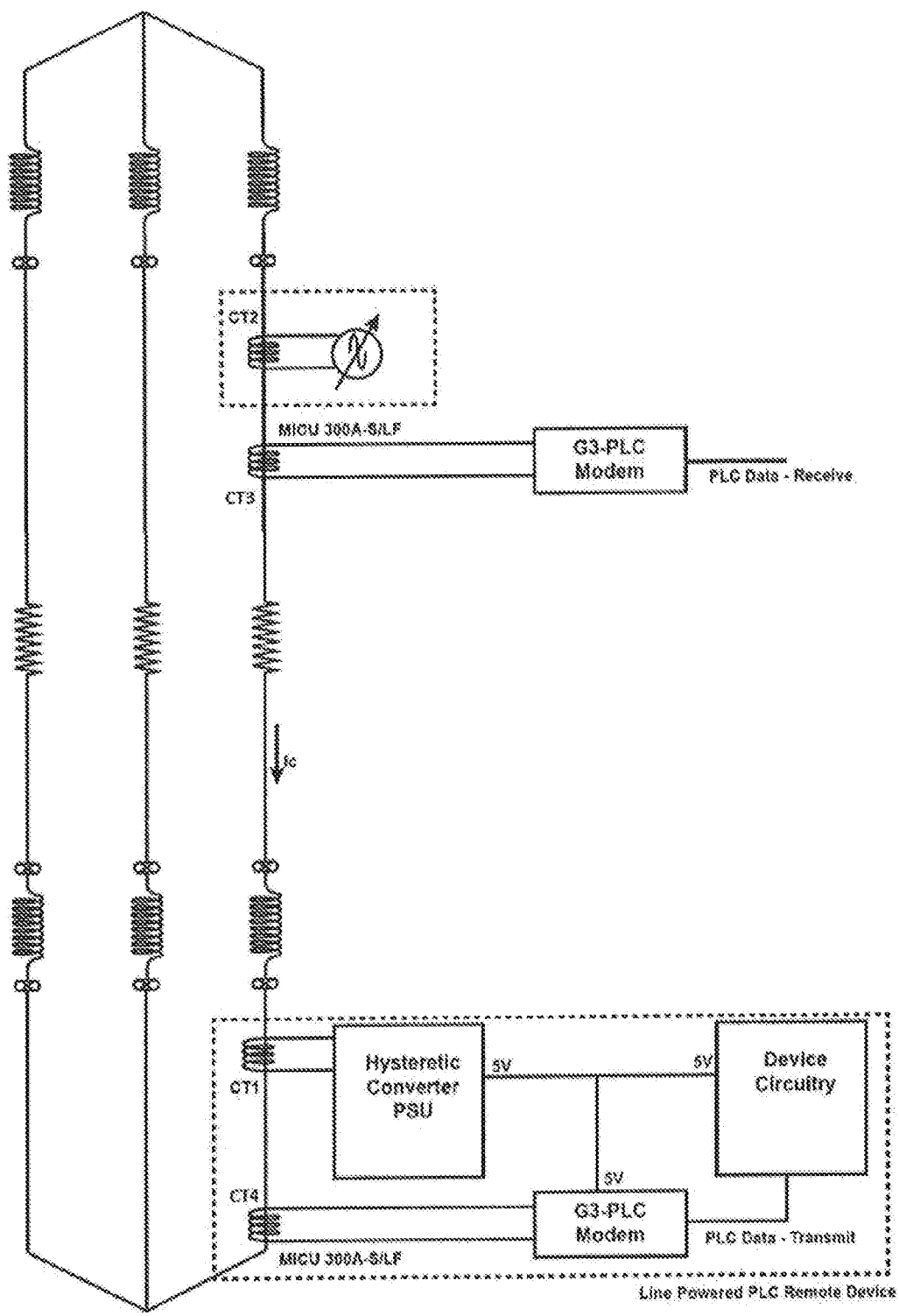
FIG. 12 is a schematic diagram of an ESP communication system.

FIG. 12 shows a power line communication system. This is based on the system of FIG. 9, but with the addition of two current transformers connected along phase C of the system. One is located at the surface and the otherdown-hole. In the example shown, the additional current transformers are each Model MICU 300 A-S/LF from Premo.

The first additional current transformer CT3 is located at the surface, but below the upper current transformer CT2. This current transformer CT3 is connected to a power line communication modem, for example, a Maxim G3 power line communication (PLC) modem to receive power line communication data. The second additional current transformer CT4 is connected below the motor winding of phase C and below the lower current transformer CT1.

The second additional current transformer CT4 is connected to a power line communication modem, for example a Maxim G3 PLC modem. Down-hole device circuitry, further described below, is connected to the hysteretic converter power supply and the modem. The lower current transformer CT1 and hysteretic converter power supply PSU power the power line communication modem and the down-hole device using the loop current $I_c$. Together, the lower current transformer CT1, the second current transformer CT4, the modem, the power supply PSU and the device circuitry form an isolated remote line powered device for transmitting data.

The down-hole device can communicate with the surface both when the motor is running and when it is not running. FIG. 12 shows how the system works when the motor is not running. As described previously, when the motor is not running, the remote down-hole device is powered using the upper current transformer CT2 and variable AC source and the lower current transformer CT1 and associated PSU. The down-hole device may be a remote measurement circuit that takes measurements of various down-well parameters, for example, temperature and pressure. The power available in the down-hole PSU is used to power the down-hole modem.

In operation, the down-hole power line communication modem receives data from the down-hole device and modulates this data before sending a modulated data signal to the down-hole current transformer CT4. The down-hole current transformer CT4 transmits the power line communication signal from the modem to phase C of the cable whilst avoiding a physical connection between the cable and the modem. The power line communication signal is then transmitted via the loop current of the cable. The surface current transformer CT3 receives the power line communication signal of the loop cable and this signal is demodulated by the surface modem to recover the original data. In this way, the system of FIG. 12 is able to transfer data from surface to down-hole using an induced phase current flow. High frequency phase-loop currents for data transfer can be used to enables higher data transfer rates than present state-of-the-art systems.

A skilled person will appreciate that variations of the disclosed arrangements are possible without departing from the invention. For example, in all of the examples described, the downhole current transformer is shown extending round the cable. However, the down-hole current transformer could equally be formed as part of a wye point of a motor of the submersible pump. As another option, the down-hole current transformer may be manufactured into a connector or splice. Where the pump has multiple motors, the down-hole current transformer may be positioned between a first and second motor of the submersible pump. As yet another option, the down-hole current transformer may be manufactured as part of a motor of the submersible pump.

Accordingly, the above description of the specific embodiment is made by way of example only and not for the purposes of limitations. It will be clear to the skilled person that minor modifications may be made without significant changes to the operation described.

The invention claimed is:

1. A system for powering down-hole instrumentation/equipment used with an electrical submersible pump that has a motor and a cable, the system comprising:
   a down-hole current transformer operable to convert a current in a phase of the cable to power down-hole instrumentation; and
   an AC source and a transformer for inducing the current into the phase of the cable.

2. The system as claimed in claim 1, wherein the AC source and transformer are located at a surface location.

3. The system as claimed in claim 1, wherein secondary windings of the down-hole current transformer are wound around a phase of the cable.

4. The system as claimed in claim 1, wherein the down-hole current transformer is part of a wye point of a motor of the submersible pump.

5. A power line communication system for use with an electrical submersible pump and a remote down-hole measurement device, the power line communication system comprising:
   a first down-hole current transformer operable to convert a first current in a phase of a cable of the pump to power the measurement device,
   a processor for processing data from the measurement device to create a data signal for sending to a surface location, and
   a second down-hole current transformer for modulating the data signal onto current in the phase of the cable.

\* \* \* \* \*